US011372877B2

(12) United States Patent
Kollenkark et al.

(10) Patent No.: US 11,372,877 B2
(45) Date of Patent: *Jun. 28, 2022

(54) COMPANION EXPERIENCE

(71) Applicant: Microsoft Technology Licensing, LLC, Redmond, WA (US)

(72) Inventors: Sean E. Kollenkark, Seattle, WA (US); Andrew P. Oakley, Seattle, WA (US); Cory J. Cirrincione, Bellevue, WA (US); Douglas D. Berrett, Seattle, WA (US); Joseph L. McClanahan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

This patent is subject to a terminal disclaimer.

(21) Appl. No.: 16/709,578

(22) Filed: Dec. 10, 2019

(65) Prior Publication Data

US 2020/0110743 A1    Apr. 9, 2020

Related U.S. Application Data

(63) Continuation of application No. 15/688,568, filed on Aug. 28, 2017, now Pat. No. 10,534,789, which is a continuation of application No. 12/750,172, filed on Mar. 30, 2010, now Pat. No. 10,489,414.

(51) Int. Cl.
*G06F 16/248* (2019.01)
*G06F 16/9535* (2019.01)
*G06F 3/14* (2006.01)
*H04L 67/10* (2022.01)

(52) U.S. Cl.
CPC .............. *G06F 16/248* (2019.01); *G06F 3/14* (2013.01); *G06F 16/9535* (2019.01); *H04L 67/10* (2013.01)

(58) Field of Classification Search
CPC .............. G06F 3/04815; G06F 3/0484; G06F 17/30991; G06F 2203/04806; G06F 3/0488; G06F 2203/04803; G06F 3/04845; G06F 21/74
See application file for complete search history.

(56) References Cited

U.S. PATENT DOCUMENTS

2009/0037949 A1* 2/2009 Birch .................. H04N 21/812
                                                            725/34
2009/0172565 A1* 7/2009 Jackson ............... H04L 65/403
                                                            715/753

OTHER PUBLICATIONS

"Office Action Issued in Canadian Patent Application No. 2,791,718", dated Jul. 23, 2020, 6 Pages.

* cited by examiner

*Primary Examiner* — Angelica Ruiz
(74) *Attorney, Agent, or Firm* — Rainier Patents, PS

(57) ABSTRACT

Various embodiments provide a so-called companion experience in which content consumed on a primary screen can serve as a source for an automatic search that returns related content that can be presented on an auxiliary screen. The companion experience can be considered to reside in a layer that can be moved across different screens. The different screens can include different physical screens, such as those associated with different computing devices, or the same physical screen in which the companion experience would be rendered in a frame or sub-window.

20 Claims, 5 Drawing Sheets

COMPANION EXPERIENCE

CROSS REFERENCE TO RELATED APPLICATIONS

This application is a continuation of U.S. application Ser. No. 15/688,568 entitled "COMPANION EXPERIENCE", filed Aug. 28, 2017, which is a continuation of U.S. application Ser. No. 12/750,172 entitled "COMPANION EXPERIENCE" filed Mar. 30, 2010, which has issued as U.S. Pat. No. 10,489,414, all of which are assigned to the assignee, and incorporated herein by reference in their entirety.

BACKGROUND

Many users like to multitask across different computing devices. For example, a user may consume content on one device and manually execute searches associated with the content on a different device. Consider a scenario in which a user is watching a football game on television and has their laptop computer with them. The user may become interested in some aspect of the game, such as learning more about a particular team's or player's statistics. If the user has a network connection, they can conduct an Internet search to discover information about the team's or player's statistics. As another example, assume that a user is playing a game on their gaming console and wishes to find out if there are any "cheat sheets" for the game. If they have a network connection and access to their laptop computer, they can conduct an Internet search to ascertain whether there are any cheat sheets for the game.

Having to manually enter searches, as described above, can be distracting for the user and can detract from the user's experience.

SUMMARY

Various embodiments provide a so-called companion experience in which content consumed on a primary screen can serve as a source for an automatic search that returns related content that can be presented on an auxiliary screen. The companion experience can be considered to reside in a layer that can be moved across different screens. The different screens can include different physical screens, such as those associated with different computing devices, or the same physical screen in which the companion experience would be rendered in a frame or sub-window.

In at least some embodiments, devices can discover one another when they are in proximity to each other and either automatically, or through a user prompt, initiate the companion experience. Once the devices discover each other, communication between the devices can occur either through a peer-to-peer connection or through a network experience such as a web service. As content is consumed on one device, information associated with the content can form the basis by which a search can be automatically conducted by a search engine supported by the web service. Search results can then be returned and rendered on a different device to provide a companion experience.

DETAILED DESCRIPTION

Overview

Various embodiments provide a so-called companion experience in which content consumed on a primary screen can serve as a source for an automatic search that returns related content that can be presented on an auxiliary screen. The companion experience can be considered to reside in a layer that can be moved across different screens. The different screens can include different physical screens, such as those associated with different computing devices, or the same physical screen in which the companion experience would be rendered in a frame or sub-window. Any suitable computing device can serve to provide a primary screen. Likewise, any suitable computing device can serve to provide an auxiliary screen. In the example below, a computing device in the form of a television provides the primary screen. This example, however, is not intended to limit the primary screen to a television. Rather, other computing devices can provide a primary screen as will become apparent below.

In at least some embodiments, devices can discover one another when they are in proximity to each other and either automatically, or through a user prompt, initiate the companion experience. Once the devices discover each other, communication between the devices can occur either through a peer-to-peer connection or through a network experience such as a web service. As content is consumed on one device, information associated with the content can form the basis by which a search can be automatically conducted by a search engine supported by the web service. Search results can then be returned and rendered on a different device to provide a companion experience. The search results can include any suitable type of data that is returned including, by way of example and not limitation, traditional search results that are typically returned responsive to a search conducted by a web search engine, aggregated content, third party content and the like. Examples of such content are provided below.

Figure 1:
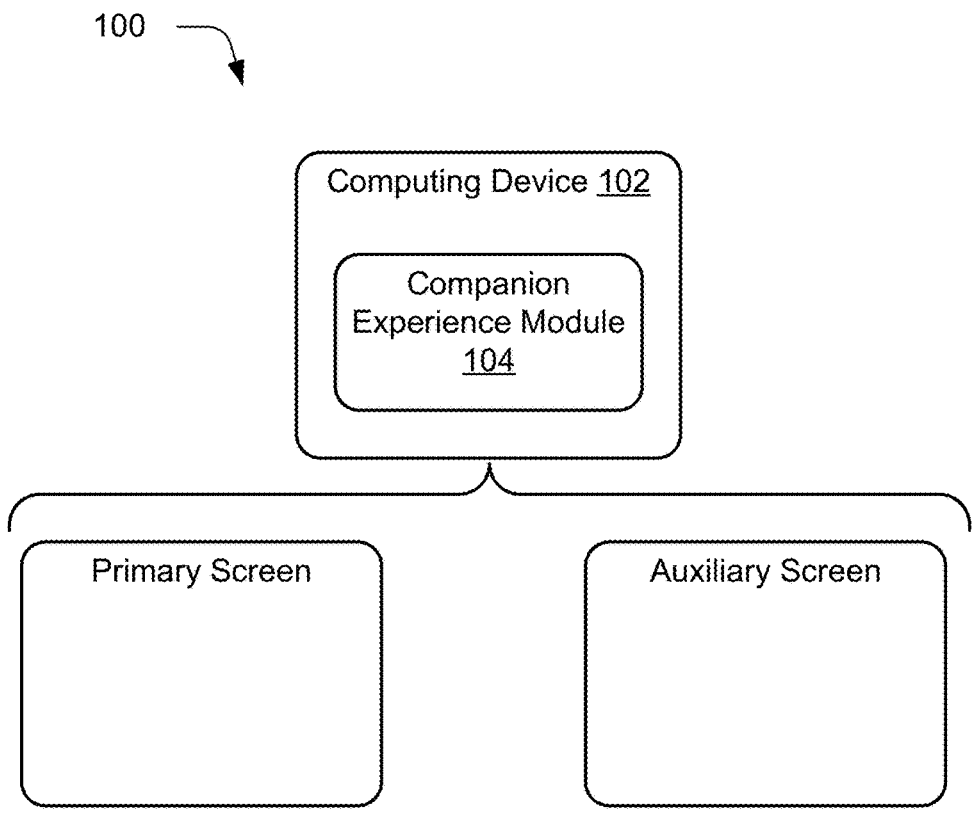
FIG. 1 is an illustration of an environment in an example implementation in accordance with one or more embodiments.

FIG. 1 illustrates a high level diagram of an example system generally at 100 in accordance with one or more embodiments. In this example, system 100 includes a computing device 102 having a software module in the form of a companion experience module 104 that operates as described above and below. Computing device 102 can be utilized to implement a so-called primary screen and/or an auxiliary screen. The primary and auxiliary screens can be implemented on the same device, or on different devices as will become apparent below.

The companion experience module 104 enables content that is consumed on the primary screen to serve as the basis for a web search for additional content that can be rendered on the auxiliary screen.

If computing device 102 includes a primary screen implementation, the companion experience module 104 can be configured to operate one or more ways to ensure that content consumed on a computing device can be searched. For example, in at least some embodiments, computing device 102 can make information associated with the consumed content available for searching. The information can include, by way of example and not limitation, media type (e.g., music, pictures, video, and television), current content (e.g., artist, album, track, tags, state for music), extended metadata, known queries, paid queries or content pointers, and the like. The information can be made available by sending the information directly to a search engine supported by a web service. This would be the situation when, for example, a single computing device supports both the primary and auxiliary screens. Alternately or additionally, the information can be made available by sending the information to a different device supporting the auxiliary screen, with the different device then sending the information to a search engine. Search results can then be returned and rendered on the auxiliary screen.

If computing device 102 includes an auxiliary screen implementation, companion experience module 104 can be configured to acquire information from the primary screen associated with content that is consumed via the primary screen. This can occur through either a pull or a push model. For example, the companion experience module 104 can query primary screen for information about content that is being currently consumed. Once the information is provided to the companion experience module of the auxiliary screen, the information can form the basis of a web search. Alternately or additionally, the companion experience module of the auxiliary screen can have information pushed to it by the companion experience module of the primary screen. This information can then form the basis of a web search.

In the discussion that follows, a section entitled "Example Environment" describes an example environment in which the inventive principles described herein can be employed. Following this, a section entitled "Implementation Example" describes an implementation in accordance with one or more embodiments. Next, a section entitled "Example Method" describes an example method in accordance with one or more embodiments. Finally, a section entitled "Example Device" describes an example device in accordance with one or more embodiments.

Having described the companion experience at a high level, consider now a discussion of an example environment in which the inventive principles can be employed.

Example Environment

Figure 2:
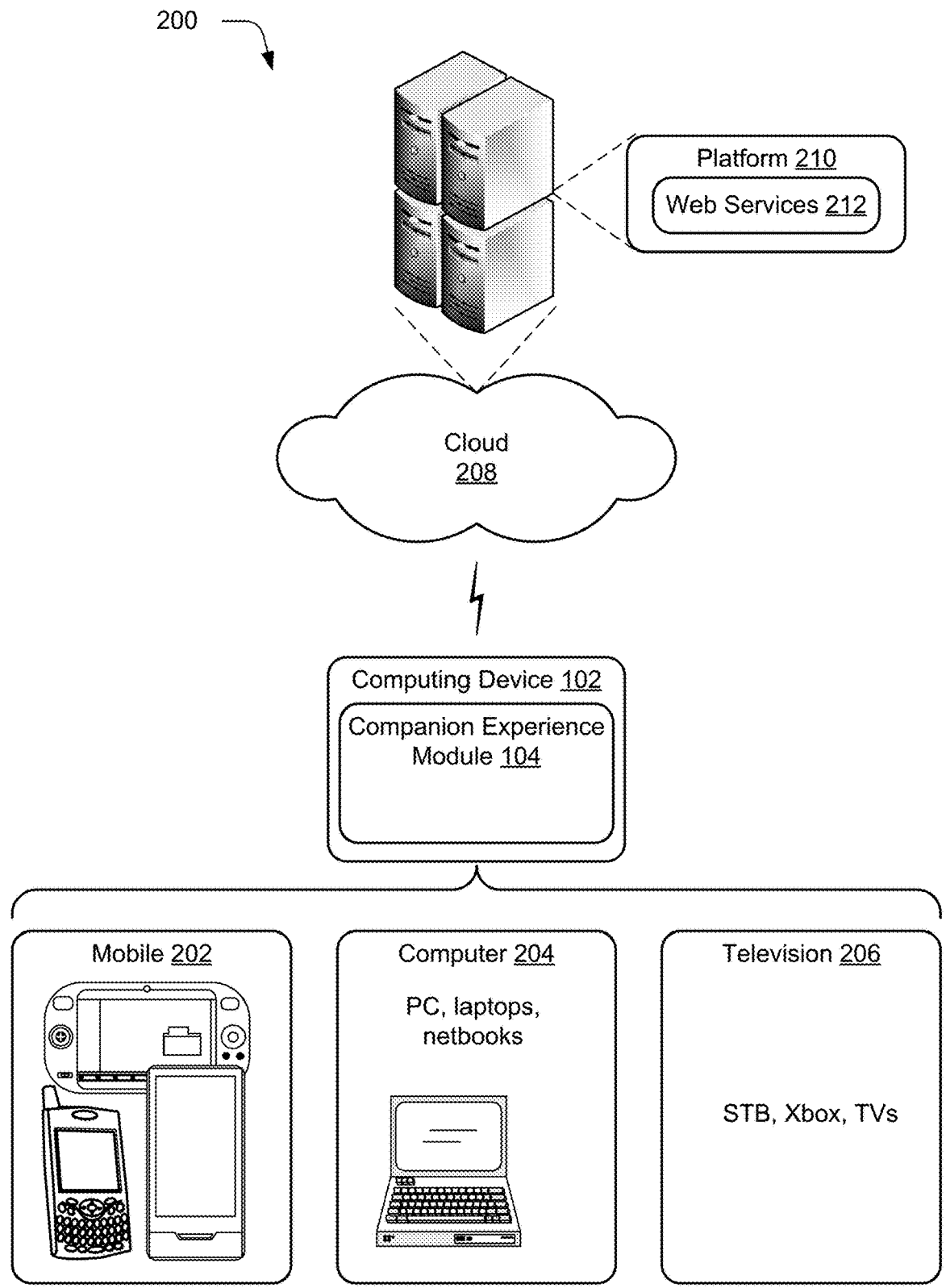
FIG. 2 illustrates an example environment in accordance with one or more embodiments.

FIG. 2 illustrates an example system showing the computing device 102, including the companion experience module 104 of FIG. 1, as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the devices that is both tailored to the device and yet common to all devices. In one embodiment, a "class" of target device is created and experiences are tailored to the generic class of devices. A class of device may be defined by physical features or usage or other common characteristics of the devices. For example, the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein are supported by these various configurations of the computing device 102 and are not limited to the specific examples described in the following sections.

Each of the different classes of device, i.e., the mobile 202 class, the computer 204 class, and the television 206 class, can support one or both of the primary screen and the auxiliary screen as described above and below. Accordingly, if content is consumed by a user on television 206, either or both of computer 204 class or mobile 202 class can serve as the auxiliary screen. Likewise, if content is consumed on computer 204, either or both of mobile 202 class or television 206 class can serve as the auxiliary screen. Further, individual devices, as noted above, can support both the primary screen and the auxiliary screen. Components of an example computing device are described below in FIG. 5.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

In the illustrated and described embodiments, platform 210 and in particular, web services 212 provide Internet and other searching capabilities for input that is provided by companion experience module 104. To this end, web services 212 can include one or more search engines that can search not only across the Internet, but across resources that may be distributed throughout the server farm.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

Having described an example environment in accordance with one or more embodiments, consider now an example that describes an implementation in accordance with one or more embodiments.

Implementation Example

Figure 3:
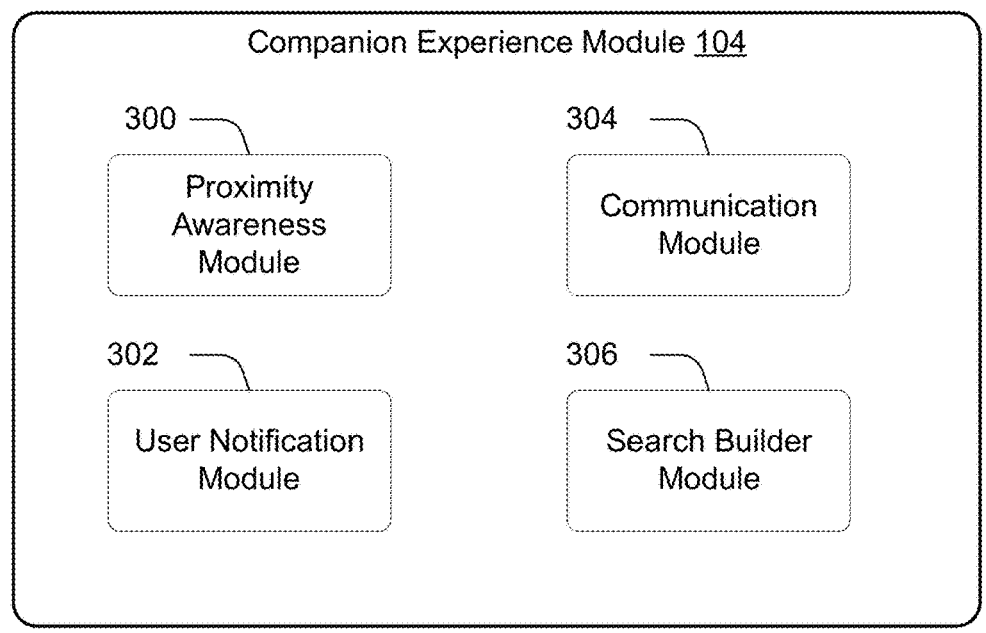
FIG. 3 illustrates an example companion experience module in accordance with one or more embodiments.

FIG. 3 illustrates an example companion experience module 104 in accordance with one or more embodiments. In the illustrated and described embodiment, the companion experience module 104 is configured to support functionality associated with supporting both the primary screen and auxiliary screen experience. To this end, companion experience module 104 can include, or otherwise make use of, a proximity awareness module 300, a user notification module 302, a communication module 304, and a search builder module 306, each of which is described below under its own respective heading.

Proximity Awareness Module

In the illustrated and described embodiment, the companion experience can be initiated or launched when two or more computing devices become aware that they are in proximity with one another. To this end, proximity awareness module 300 can ascertain proximity with respect to other devices and/or act on proximity information that it receives from outside the companion experience module 104. The proximity of awareness module 300 can be implemented using any suitable type of technology such as, by way of example and not limitation, infrared detection, Bluetooth detection, network awareness of other devices connected to a common network, and the like. Alternately or additionally, the proximity awareness module 300 may report its location to a third-party service, such as a web service described above. The web service, in turn, may then notify the companion experience module 104 when another computing device is in the proximity.

In one or more embodiments, proximity awareness functionality is performed by the computing device that serves as the primary screen. For example, assume that a user is watching a television program on a television that serves as the primary screen. If the user happens to bring their laptop computer into proximity with the television, the television would, through proximity awareness module 300, ascertain the proximity of the laptop computer.

User Notification Module

Once two or more devices ascertain that they are in proximity with one another, the user notification module 302 can be utilized to notify the user that they can initiate a companion experience. This notification can be presented in the form of a suitable user interface that notifies the user that a companion experience is possible by virtue of the proximity of one or more computing devices. In the example just above, the television serving as the primary screen would present a user interface to the user that prompts the user for a companion experience. If the user accepts, then the device serving as the auxiliary screen—in this case a laptop computer—would launch its companion experience module which can then be seeded with search content based on the content being consumed on the primary screen.

Communication Module

Once the devices have discovered one another by virtue of being in proximity with one another, the devices can communicate in any suitable way such as, by way of example and not limitation, through peer-to-peer communication, through a third-party entity such as web service 212 (FIG. 2) and the like.

The communication module 304 enables the device serving as the primary screen to report information to the device serving as the auxiliary screen, so that the auxiliary screen device can conduct a suitable search for additional content. Likewise, communication module 304 enables the device serving as the auxiliary screen to receive information from the device serving as the primary screen so that a search can be conducted.

In one implementation, the device serving as the auxiliary screen can subscribe to the primary screen (whether on the same device or different) and listen for change events. The device serving as the auxiliary screen can also query the primary screen for new information associated with content that is being consumed on the primary screen device. Such information can include, by way of example and not limitation, media type, current content, metadata, known queries, paid queries, content pointers and the like. For example, such information can include the title of a program, the time that the program is on and the like. In addition, such information can include more granular information about the specific contents within a particular piece of media, and timing information associated with when the content appears in a piece of media. For example, the specific contents can include such things as a song that happens to be playing in a television program, a particular actor, a current game level in a game that is being played, and the like. It is to be appreciated and understood, however, that content being consumed on the primary screen need not necessarily constitute entertainment content such as television programs, pictures, music, videos, movies, and/or gaming. Rather, the content that is being consumed on the primary screen can comprise any type of content such as, by way of example and not limitation, e-mail content, application content, webpage content, and the like. For example, a user may conduct an Internet search for "Hawaii vacations" on the primary screen and the auxiliary screen, via the companion experience, may show travel deals available from Bing™ Travel on Hawaii. Alternately or additionally, the user may be looking an at email about mountain biking on the primary screen, and the auxiliary screen, via the companion experience, may show photos pertaining to mountain biking. These photos may constitute what can be considered as typical search results that are returned from an Internet search engine. Alternately or additionally, the photos may constitute aggregated content that is available from a third party.

Once the auxiliary screen device receives this information via communication module 304, it can employ the search builder module 306 as described below.

Search Builder Module

When the auxiliary screen device receives the information from the primary screen device, it can formulate a search query that is then provided to a suitably-configured web service that includes a search engine. Any suitable search engine can be used. For example, Microsoft's Bing™ search engine constitutes but one example of a search engine that can be utilized. Search results that are returned from the search engine can then be rendered on the device serving as the auxiliary screen. The device serving as the auxiliary screen can use timing information that it received from the device serving as the primary screen in order to know when to render the search results. In the event that one device serves as both the primary and the auxiliary screen, the search results can be rendered in a frame or sub-window on the device.

It is to be appreciated and understood that the search results that are returned from the search engine can be pivoted in any suitable way. For example, the search results can include or be pivoted to expose web results, video, images, shopping-related information, and the like. Furthermore, the search results can include content such as editorials or data that may have been purchased for specific topics. Thus, there may be a situation in which a person is watching a video on television and a companion experience returns data including related artists, history, and the like. Thus, the information returned in a search may not simply constitute information that was gleaned from the web in a web crawl. Rather, such information may include third-party editorial content or data that was purchased for the purpose of being returned responsive to a search. In addition, returned content can also include advertisements, annotated community content (such as Wiki content) and the like.

Example Method

Figure 4:
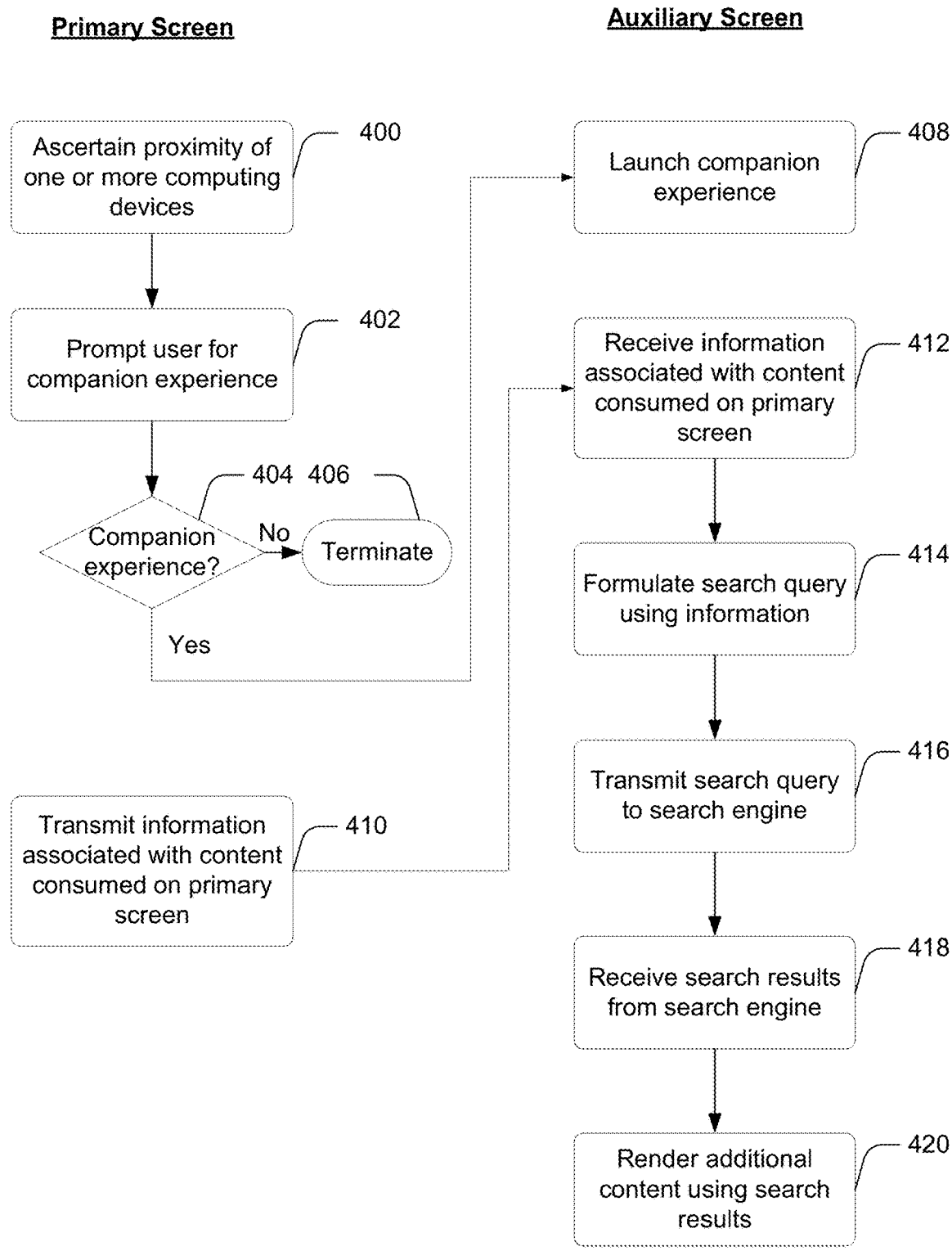
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the method and particularly, the companion experience, can be implemented by a companion experience module such as the module described above. The flow diagram depicts two columns, one designated "Primary Screen" and the other designated "Auxiliary Screen." The functionality appearing in a particular column is, in this example, intended to be performed by a computing device that serves as either or both of the primary or auxiliary screens.

Step 400 ascertains the proximity of one or more computing devices. Any suitable technique can be used to ascertain proximity, examples of which are provided above. In one or more embodiments, proximity can include geographic proximity. Responsive to ascertaining the proximity of the computing device(s), step 402 prompt a user for a companion experience. If, at step 404, the user declines the companion experience, step 406 terminates the method.

If, on the other hand, at step 404 the user opts for the companion experience, step 408 launches a companion experience module on the computing device that serves as the auxiliary screen.

Step 410 transmits information associated with content that is being consumed on the primary screen to the auxiliary screen. Transmission can occur between different devices and/or within a common device that serves as both the primary and auxiliary screen.

Step 412 receives the information associated with the content being consumed on the primary screen and step 414 formulates a search query using the information. Step 416 transmits the search query to a search engine and step 418 receives search results back from the search engine. Step 420 renders additional content using the search results. Examples of information that can be rendered in or on the auxiliary screen are provided above.

The above-described method can be utilized to enable an automated companion experience that relieves the user of having to manually enter search terms associated with content that is being consumed on the primary screen. As content changes on the primary screen, so too does the companion content by virtue of the automatic transmission of information from the primary screen to the auxiliary screen. In addition, the companion experience can be provided with respect to individual applications or on different devices.

Example Device

Figure 5:
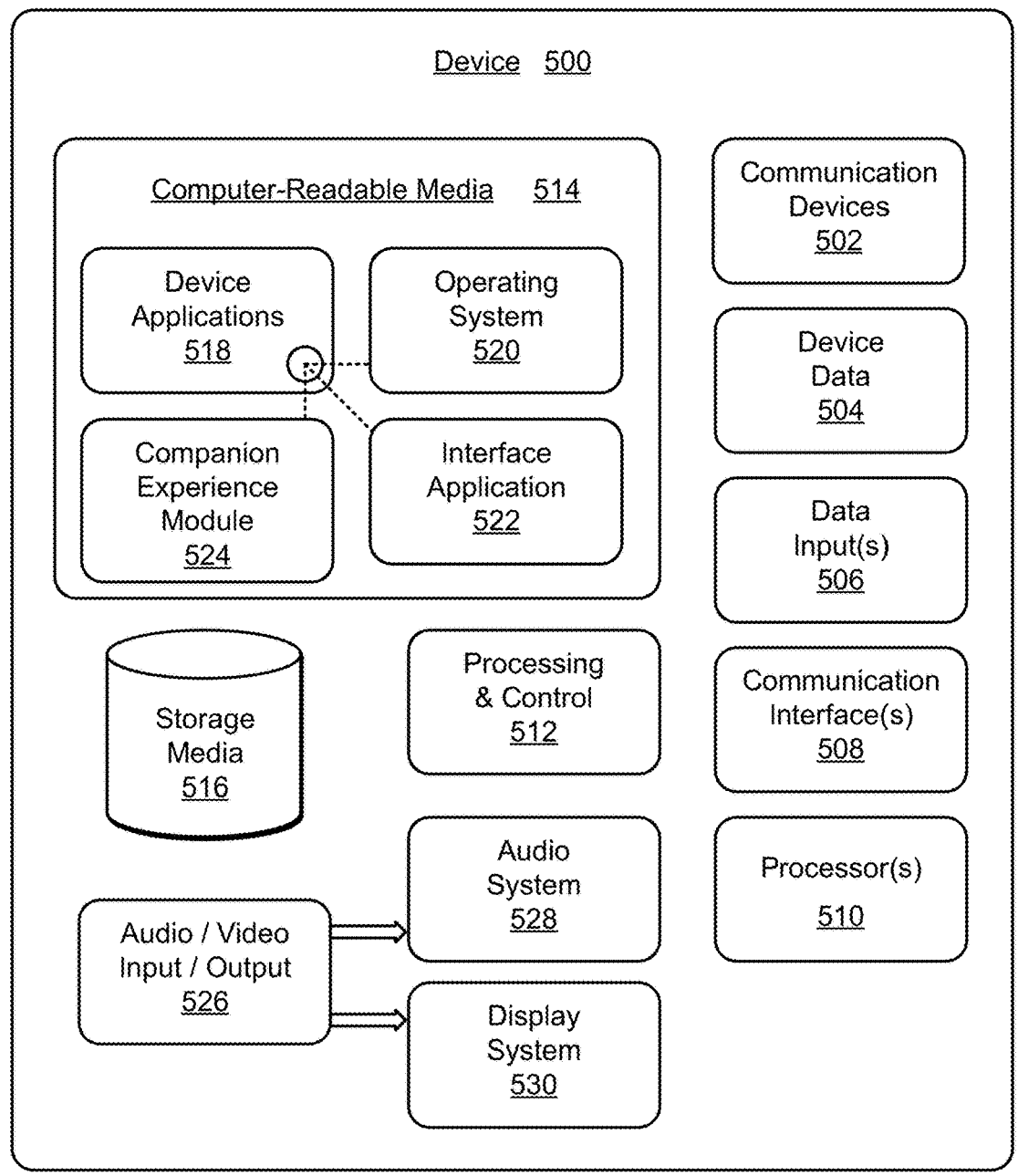
FIG. 5 illustrates an example computing device that can be utilized to implement various embodiments described herein.

FIG. 5 illustrates various components of an example device 500 that can be implemented as any type of portable and/or computer device as described with reference to FIGS. 1 and 2 to implement embodiments of the companion experience described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and to implement the companion experience embodiments described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the companion experience described herein. In this example, the device applications 518 include an interface application 522 and a companion experience module 524 that are shown as software modules and/or computer applications. The companion experience module 524 is representative of software that is used to provide the functionality that is described above.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Conclusion

Various embodiments provide a so-called companion experience in which content consumed on a primary screen can serve as a source for an automatic search that returns related content that can be presented on an auxiliary screen. The companion experience can be considered to reside in a layer that can be moved across different screens. The different screens can include different physical screens, such as those associated with different computing devices, or the same physical screen in which the companion experience would be rendered in a frame or sub-window.

In at least some embodiments, devices can discover one another when they are in proximity to each other and either automatically, or through a user prompt, initiate the companion experience. Once the devices discover each other, communication between the devices can occur either through a peer-to-peer connection or through a network experience such as a web service. As content is consumed on one device, information associated with the content can form the basis by which a search can be automatically conducted by a search engine supported by the web service. Search results can then be returned and rendered on a different device to provide a companion experience.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
    displaying content on a first screen of a computing device;
    presenting a user interface including a user prompt for display of a companion experience on a second screen of the computing device, wherein the companion experience enables the content that is displayed on the first screen to serve as a basis for a web search for additional content that is renderable on the second screen, wherein the additional content is different from the content displayed on the first screen;
    receiving, in response to presentation of the user prompt, a user input to initiate the companion experience on the second screen;
    initiating the web search based on information associated with but different from the displayed content; and
    displaying, in response to the web search, a resulting display of the additional content on the second screen.

2. The method of claim 1, wherein the companion experience resides in a layer that is moveable between the first screen and the second screen.

3. The method of claim 1, wherein the computing device is connected to a central computing device, the central computing device comprising a server farm and a platform of web services including a search engine that provides searching capabilities across a network and across resources distributed throughout the server farm.

4. The method of claim 3, wherein the information comprises search-related information associated with the content.

5. The method of claim 4, further comprising:
    automatically sending the search-related information to the search engine supported by a web service in the central computing device;
    receiving search results related to the content from the search engine in response to the search-related information; and
    rendering and updating the search results on the second screen as the content is being rendered on the first screen.

6. The method of claim 4, wherein the search-related information includes one or more of media type, current content, or metadata associated with the content displayed on the first screen.

7. The method of claim 1, wherein the computing device comprises one of a mobile class device, a computer class device, or a television class device.

8. The method of claim 1, wherein the user prompt is displayed on the first screen.

9. The method of claim 1, further comprising:
    obtaining new information for use by the second screen, wherein the new information is associated with the content that is displayed on the first screen.

10. The method of claim 1, wherein initiating the web search comprises formulating a search query for the web search based on the information, and providing the search query to a web service.

11. The method of claim 1, wherein the first screen and the second screen are integrated components of the computing device.

12. One or more computer-readable storage media comprising instructions stored thereon that, responsive to execution by a processor of a computing device, perform operations comprising:
    displaying content on a first screen of the computing device;
    presenting a user interface including a user prompt for display of a companion experience on a second screen of the computing device, wherein the companion experience enables the content that is displayed on the first screen to serve as a basis for a web search for additional content that is renderable on the second screen, wherein the additional content is different from the content displayed on the first screen;
    receiving, in response to presentation of the user prompt, a user input to initiate the companion experience on the second screen;
    initiating the web search based on information associated with but different from the displayed content; and
    displaying, in response to the web search, a resulting display of the additional content on the second screen.

13. The one or more computer-readable storage media of claim 12, wherein the companion experience resides in a layer that is moveable between the first screen and the second screen.

14. The one or more computer-readable storage media of claim 12, wherein the computing device is connected to a central computing device, the central computing device comprising a server farm and a platform of web services including a search engine that provides searching capabilities across the Internet and across resources distributed throughout the server farm.

15. The one or more computer-readable storage media of claim 14, wherein the information comprises search-related information associated with the content, wherein the operations further comprise:
  automatically sending the search-related information to the search engine supported by a web service in the central computing device;
  receiving search results related to the content from the search engine in response to the search-related information; and
  rendering and updating the search results on the second screen as the content is being rendered on the first screen.

16. The one or more computer-readable storage media of claim 12, wherein the operations further comprise at least one of:
  subscribing the second screen to the first screen and listening to the first screen for change events; or
  querying the first screen for new information for use by the second screen, wherein the new information is associated with the content that is displayed on the first screen.

17. A computing device comprising:
  a first screen;
  a second screen;
  one or more processors; and
  one or more memories having instructions stored thereon that, responsive to execution by the one or more processors, perform operations comprising:
  displaying content on the first screen of the computing device;
  presenting a user interface including a user prompt for display of a companion experience on the second screen of the computing device, wherein the companion experience enables the content that is displayed on the first screen to serve as a basis for a web search for additional content that is renderable on the second screen, wherein the additional content is different from the content displayed on the first screen;
  receiving, in response to presentation of the user prompt, a user input to initiate the companion experience on the second screen;
  initiating the web search based on information associated with but different from the displayed content; and
  displaying, in response to the web search, a resulting display of the additional content on the second screen.

18. The computing device of claim 17, wherein the companion experience resides in a layer that is moveable between the first screen and the second screen.

19. The computing device of claim 17, wherein the computing device is connected to a central computing device, the central computing device comprising a server farm and a platform of web services including a search engine that provides searching capabilities across the Internet and across resources distributed throughout the server farm;
  wherein the information comprises search-related information associated with the content;
  wherein the operations further comprise:
    automatically sending the search-related information to the search engine supported by a web service in the central computing device;
    receiving search results related to the content from the search engine in response to the search-related information; and
    rendering and updating the search results on the second screen as the content is being rendered on the first screen.

20. The computing device of claim 17, the operations further comprising at least one of:
  subscribing the second screen to the first screen and listening to the first screen for change events; or
  querying the first screen for new information for use by the second screen, wherein the new information is associated with the content that is displayed on the first screen.

* * * * *